(12) United States Patent
Neubauer

(10) Patent No.: US 6,549,588 B2
(45) Date of Patent: Apr. 15, 2003

(54) COMMUNICATIONS SYSTEM AND CORRESPONDING RECEIVER UNIT

(75) Inventor: Andre Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/094,559

(22) Filed: Mar. 8, 2002

(65) Prior Publication Data

US 2002/0111148 A1 Aug. 15, 2002

Related U.S. Application Data

(63) Continuation of application No. PCT/EP00/08701, filed on Sep. 6, 2000.

(30) Foreign Application Priority Data

Sep. 8, 1999 (DE) ........................................ 199 42 944

(51) Int. Cl.[7] .................................................. H03D 1/24
(52) U.S. Cl. ..................... 375/332; 455/313; 455/316; 455/318; 455/116; 455/71; 455/130; 375/279; 375/280; 375/329; 329/304
(58) Field of Search ............................... 455/313, 318, 455/116, 130, 71; 375/279, 280, 329, 332; 329/304

(56) References Cited

U.S. PATENT DOCUMENTS

| | | | | |
|---|---|---|---|---|
| 3,746,996 A | * | 7/1973 | Peoples | 327/552 |
| 4,888,793 A | * | 12/1989 | Chanroo et al. | 329/306 |
| 5,301,206 A | * | 4/1994 | Ishigaki et al. | 375/141 |
| 5,398,002 A | * | 3/1995 | Bang | 329/302 |
| 5,402,449 A | * | 3/1995 | Schultes et al. | 329/306 |
| 5,440,267 A | * | 8/1995 | Tsuda et al. | 329/308 |
| 5,448,602 A | * | 9/1995 | Ohmori et al. | 375/330 |
| 5,450,612 A | * | 9/1995 | Chanroo et al. | 340/7.2 |
| 5,757,862 A | * | 5/1998 | Ishizu | 329/304 |
| 5,887,247 A | * | 3/1999 | Baltus et al. | 455/135 |
| 5,907,584 A | * | 5/1999 | Leveque | 370/202 |
| 6,028,888 A | * | 2/2000 | Roux | 370/208 |

* cited by examiner

*Primary Examiner*—William Trost
*Assistant Examiner*—Marcos Torres
(74) *Attorney, Agent, or Firm*—Laurence A. Greenberg; Werner H. Stemer; Ralph E. Locher

(57) ABSTRACT

Angle-modulated signals are transmitted in a communications system, in which coding information has been inserted into the transmitted data at regular intervals. The coding information is phase-modulated together with the transmitted data. This coding is used for pulse shaping, so that the receiver can recover the digital transmitted data with less implementation complexity and without carrier phase control by using appropriate signal processing.

10 Claims, 3 Drawing Sheets

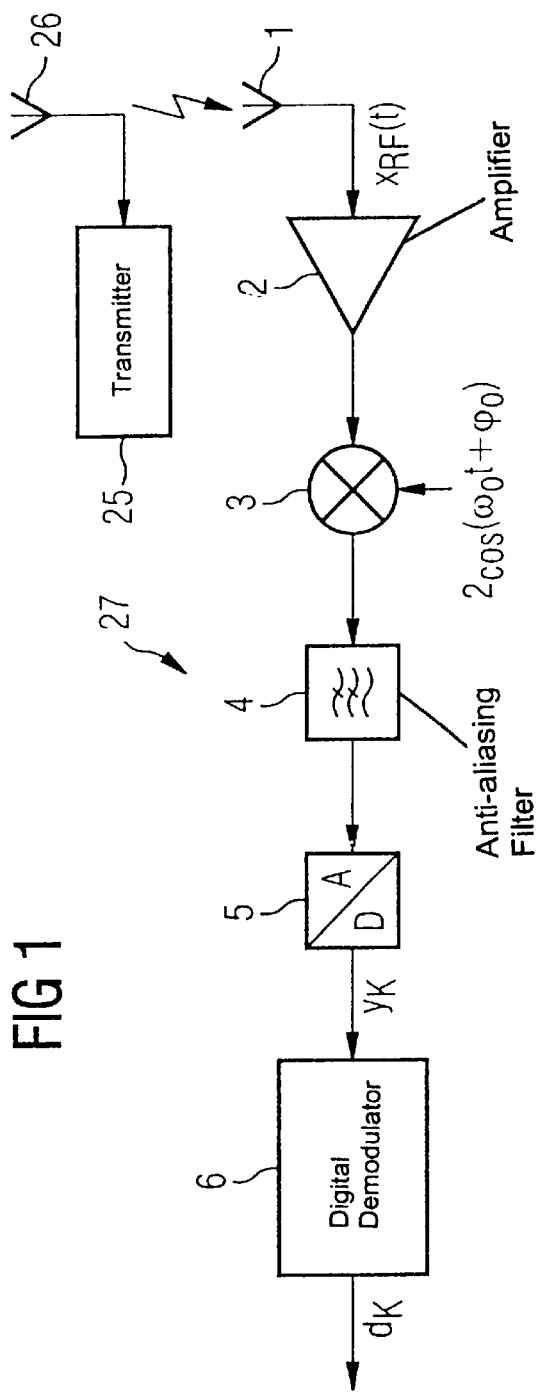
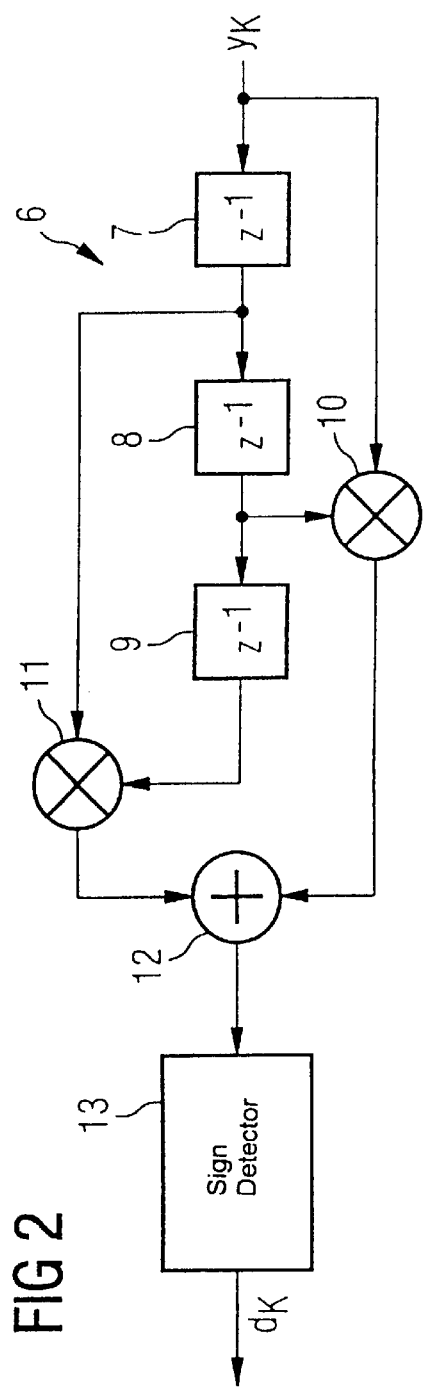
FIG 1
FIG 2

COMMUNICATIONS SYSTEM AND CORRESPONDING RECEIVER UNIT

CROSS-REFERENCE TO RELATED APPLICATION

This application is a continuation of copending International Application PCT/EP00/08701, filed Sep. 6, 2000, which designated the United States.

BACKGROUND OF THE INVENTION

Field of the Invention

The present invention relates to a communications system in which angle-modulated signals, in particular MSK signals (Minimum Shift Keying) are transmitted, and to a corresponding receiver.

Superheterodyne receivers are frequently used for receiving and demodulating phase-modulated signals in wire-free communications systems, such as DECT systems (Digital European Cordless Telephone) or radio systems that are operated in the so-called unlicensed ISM frequency bands (Industrial Scientific Medical). In order to achieve greater system integration and thus reduced system costs, so-called low-IF (Intermediate Frequency) or zero-IF (homodyne) receivers are also increasingly being used, which do not require any external filters to suppress mirror frequencies. Low-IF receivers use a relatively low intermediate frequency which may be, for example, about 1 MHz for input signal frequencies of about 2 GHz, while the intermediate frequency in zero-IF receivers is 0 MHz. In receivers of this type, the phase-modulated received signal is demodulated using suitable signal processing, which is frequently analog (for example in DECT receivers).

FIG. 4 shows a simplified block diagram of such a low-IF or zero-IF (homodyne) receiver.

In the case of phase modulation, the communication information that will be transmitted is transmitted via the phase of a carrier signal, with the phase of the carrier signal being varied as a function of the value of the communication information to be transmitted. The radio-frequency signal $X_{RF}(t)$ received via a receiving antenna 1 in general has the form:

$$X_{RF}(t)=u(t)cos(\omega_0 t+\phi_0)-v(t)sin(\omega_0 t+\phi_0)=Re\{[u(t)+jv(t)]exp[(j\omega_0 t+\phi_0)]\}$$

In this case, $\omega_0$ denotes the carrier frequency, with $\phi_0$ representing the zero phase. The signal components u(t) and v(t) contain the time-dependent phase information, which corresponds to the communication or message bits that will be transmitted. The values of the individual communication bits can be deduced in the receiver by recovering this phase information.

For this purpose, in low-IF or zero-IF receivers, the received signal $X_{RF}(t)$ is initially filtered using a bandpass filter 14, and is amplified using a linear amplifier 23. The received signal that has been processed in this way is then split between two signal paths, namely an I signal path and a Q signal path. In the I signal path, the received signal is multiplied in a mixer 15 by the signal $cos(\omega_0 t)$ from a local oscillator 17, while in the Q signal path, the received signal is multiplied in a mixer 16 by the corresponding quadrature signal $-sin(\omega_0 t)$, which is obtained from the oscillator signal $cos(\omega_0 t)$ by using an appropriate phase shifting unit 18. Low-pass filtering, using appropriate respective anti-aliasing filters 19 and 20, and A/D conversion, using respective appropriate A/D converters 21 and 22, are then carried out in both signal paths. The output signals from the two signal paths are finally evaluated by a signal processing unit (which, in the present case, is digital) to obtain, from the signals recovered in this way, the generally complex useful signal $[u(t)+jv(t)]\cdot exp(\omega_0 t)$ with the desired phase information, from which the values of the transmitted communication or message bits $d_k$ can in turn be derived.

It can be seen from FIG. 4 that such a homodyne receiver generally requires two real signal paths having a respective mixer 15 or 16, a respective filter 19 or 20, and a respective A/D converter 21 or 22. Furthermore, a component 18 is required, in order to produce the quadrature signals from the local oscillator 17. The procedure described above is, admittedly, in principle suitable for all types of phase modulation. However, it does not exploit the characteristics of suitably defined modulation methods in order to reduce the complexity.

In the case of phase-locked and frequency-locked (that is to say coherent) reception, it is also necessary to control the carrier phase in the receiver, since the zero phase $\phi_0$ is unknown, which increases the implementation complexity in the receiver in a corresponding manner.

SUMMARY OF THE INVENTION

It is accordingly an object of the invention to provide a communications system for transmitting and receiving angle-modulated signals which overcomes the above-mentioned disadvantages of the prior art apparatus and methods of this general type.

In particular, it is an object of the invention to provide a communications system for transmitting and receiving angle-modulated signals, specifically digital phase-modulated or frequency-modulated signals, and a corresponding receiver, in which case the receiver can be implemented with considerably less complexity as compared with prior art receivers.

With the foregoing and other objects in view there is provided, in accordance with the invention, a communications system that includes a transmitter for transmitting an angle-modulated signal having communication information and coding information that have been modulated onto a carrier signal at a carrier frequency. The transmitter inserts the coding information into the communication information at regular intervals. The transmitter constructs the angle modulated signal by performing an angle modulation process in which, for each item of the communication information and for each item of coding information, a corresponding phase change in the carrier signal is obtained. The communications system includes a receiver for receiving the angle-modulated signal. The receiver has a mixer for mixing the angle-modulated signal with a signal having the carrier frequency of the carrier signal such that a baseband signal is obtained in which the carrier frequency has been removed. The baseband signal has a phase profile corresponding to the phase change for each item of the communication information and to the phase change for each item of coding information. The receiver has an analog/digital converter for sampling the phase profile of the baseband signal from the mixer and for converting the baseband signal to a digital data sequence having phase sample values. The receiver has a digital evaluation device that receives the digital data sequence from the analog/digital converter. The digital evaluation device initially separately, obtains first processing results by processing ones of the phase sample values corresponding to successive items of the communication information and obtains second processing results by processing ones of the phase sample values corresponding to successive items of the coding information. The digital evaluation device combines the first processing results with the second processing results to obtain a combination result. The digital evaluation device evaluates the combination result to recover the communication information as a function of the combination result.

In accordance with an added feature of the invention, the digital evaluation device includes: a shift register configuration for buffer-storing successive ones of the phase sample values of the digital data sequence from the analog/digital converter; a multiplier for obtaining a first result by multiplying together the ones of the phase sample values that correspond to the successive items of the communication information; a multiplier for obtaining a second result by multiplying together the ones of the phase sample values that correspond to the successive items of the coding information; a combiner for obtaining a combination result by combining the first result and the second result; and a detector device for evaluating the combination result from the combiner to recover the communication information as a function of the combination result.

In accordance with an additional feature of the invention, the combiner is an adder.

In accordance with another feature of the invention, the multiplier for obtaining the first result defines a first multiplier; the multiplier for obtaining the second result defines a second multiplier; the shift register configuration sequentially receives the successive ones of the phase sample values of the digital data sequence from the analog/digital converter; and the shift register configuration has a first delay element, a second delay element, and a third delay element that are connected in series. At a given instant of time, a fourth given one of the phase sample values is being supplied to the first delay element from the analog/digital converter, a third given one of the phase sample values is stored in the first delay element, a second given one of the phase sample values is stored in the second delay element, and a first given one of the phase sample values is stored in the third delay element. At the given instant of time, the first multiplier multiplies the fourth given one of the phase sample values by the second given one of the phase sample values. At the given instant of time, the second multiplier multiplies the third given one of the phase sample values by the first given one of the phase sample values.

In accordance with a further feature of the invention, the communication information is a sequence and each item in the sequence has a binary value. The transmitter modulates the communication information and modulates the coding information onto the carrier signal such that, in the angle-modulated signal, a phase change of $+\pi/2$ in the carrier signal is allocated to a first binary value that will be transmitted and a phase change of $-\pi/2$ in the carrier signal is allocated to a second binary value that will be transmitted. The detector device detects a mathematical sign of the combination result from the combiner to recover the binary value of each item of the sequence of the communication information as a function of the mathematical sign.

In accordance with a further added feature of the invention, a first binary value that results in a phase change of $+\pi/2$ in the carrier signal during the angle modulation in the transmitter is chosen as a value for the coding information.

In accordance with a further additional feature of the invention, a fixed binary value is selected to be either a zero or a one. The transmitter inserts the fixed binary value as the coding information at regular intervals into the communication information. In other words, the transmitter inserts the same binary value as the coding information at regular intervals into the communication information.

In accordance with yet an added feature of the invention, the receiver recovers the communication information by phase-incoherent and single-channel signal processing the angle-modulated signal, without I/Q splitting the angle-modulated signal.

In accordance with yet an additional feature of the invention, the transmitter inserts the coding information between each two successive items of the communication information; and the digital evaluation device of the receiver, initially separately, obtains the first processing result by processing two of the phase sample values corresponding to the successive items of the communication information and obtains the second processing result by processing two of the phase sample values corresponding to the successive items of the coding information.

With the foregoing and other objects in view there is also provided, in accordance with the invention, a receiver unit for receiving angle-modulated signals. The receiver unit includes a receiver for receiving an angle-modulated signal having communication information and coding information. The coding information has been inserted at regular intervals into the communication information. The communication information and the coding information have been modulated onto a carrier signal at a carrier frequency using an angle modulation process such that, for each item of the communication information and for each item of the coding information, a corresponding phase change in the carrier signal is obtained. The receiver has a mixer for mixing the angle-modulated signal with a signal having the carrier frequency of the carrier signal such that a baseband signal is obtained in which the carrier frequency has been removed. The baseband signal has a phase profile corresponding to the phase change for each item of the communication information and to the phase change for each item of the coding information. The receiver has an analog/digital converter for sampling the phase profile of the baseband signal from the mixer and for converting the baseband signal to a digital data sequence having phase sample values. The receiver has a digital evaluation device that receives the digital data sequence from the analog/digital converter. The digital evaluation device initially separately, obtains first processing results by processing ones of the phase sample values corresponding to successive items of the communication information and obtains second processing results by processing ones of the phase sample values corresponding to successive items of the coding information. The digital evaluation device combines the first processing results with the second processing results to obtain a combination result. The digital evaluation device evaluates the combination result to recover the communication information as a function of the combination result.

The present invention proposes a suitable definition of the digital modulation method for coding and pulse shaping, so that, with regard to the analog front end, the receiver can be produced without any carrier phase control, and with regard to the known homodyne receiver shown in FIG. 4, the receiver can be produced with approximately half the circuit complexity. For this purpose, coding information or coding bits is or are inserted into the message bits to be transmitted, in which case, for example, a coding bit with the fixed binary value "1" can, in particular, be inserted between each two successive message bits. The receiver is designed such that the original message bits can be detected with just one real signal path, that is to say, without any complex I/Q signal path, by using suitable signal processing of the angle-modulated signal that is based on the message and coding bits. In contrast to the known homodyne receiver shown in FIG. 4, the aim of the receiver is not signal reconstruction, but identification of the digital transmitted data.

The proposed coding and pulse shaping allows phase-incoherent demodulation of the angle-modulated received signal and detection of the digital transmitted data irrespective of any possible phase shift between the radio-frequency received signal in the receiver and the local oscillator signal that is used in the receiver to down-mix the received signal to baseband. There is thus no need for the carrier phase control required for the homodyne receiver shown in FIG. 4.

Furthermore, in contrast to the receiver shown in FIG. 4, the mixer, filter and A/D converter need be provided only once. Since there is no need for a complex I/Q signal path, there is no need either for the quadrature signal generation for the signal from the local oscillator, and there is no need to observe any matching requirements between the I/Q signal paths.

Other features which are considered as characteristic for the invention are set forth in the appended claims.

Although the invention is illustrated and described herein as embodied in a communications system and corresponding receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a simplified block diagram of an inventive receiver;

FIG. 2 shows one possible implementation of the digital demodulator shown in FIG. 1;

DESCRIPTION OF THE PREFERRED EMBODIMENTS

Figure 3:
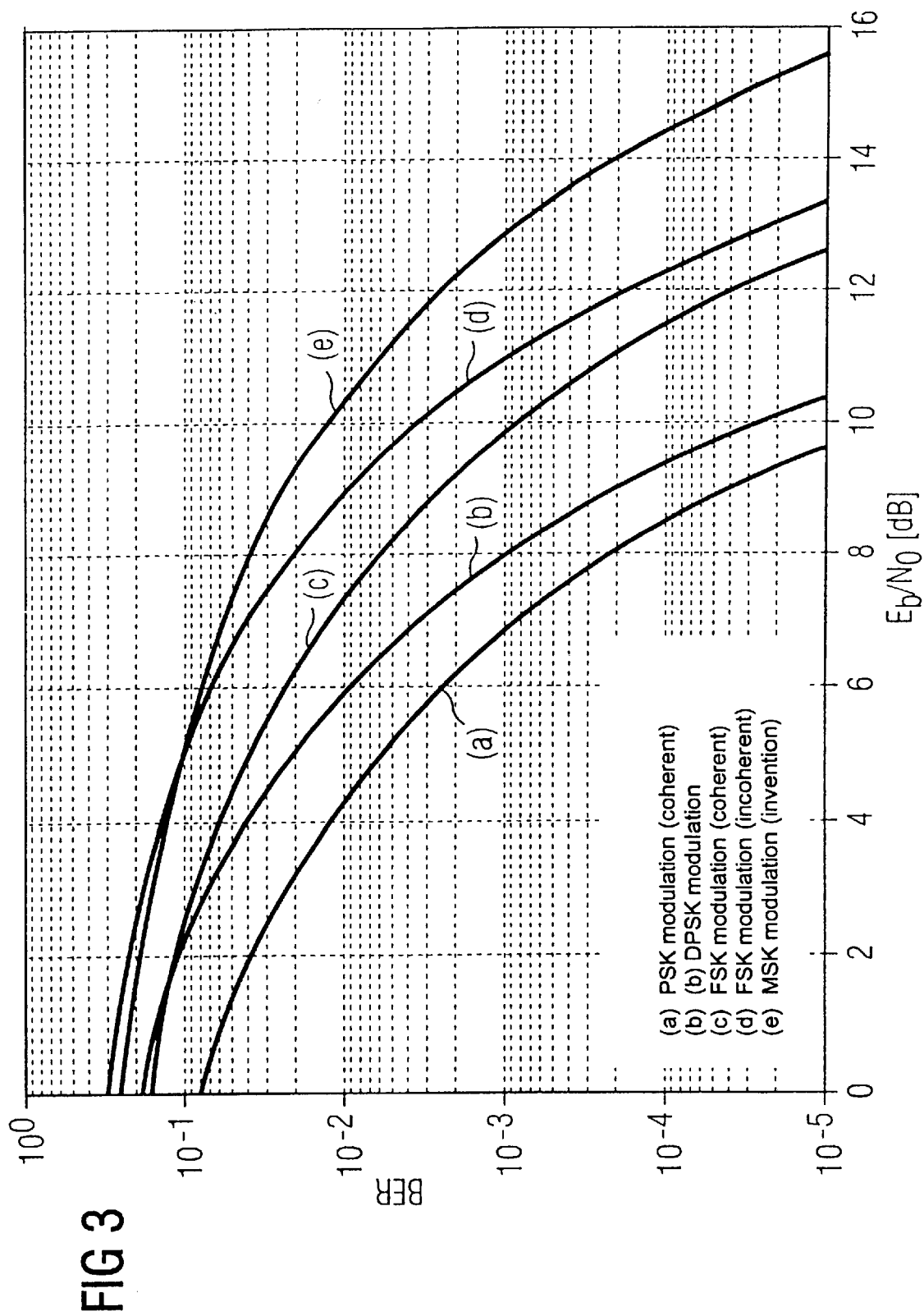
FIG. 3 is a graph used for explaining the bit error rate that can be achieved when using the present invention.
Figure 4:
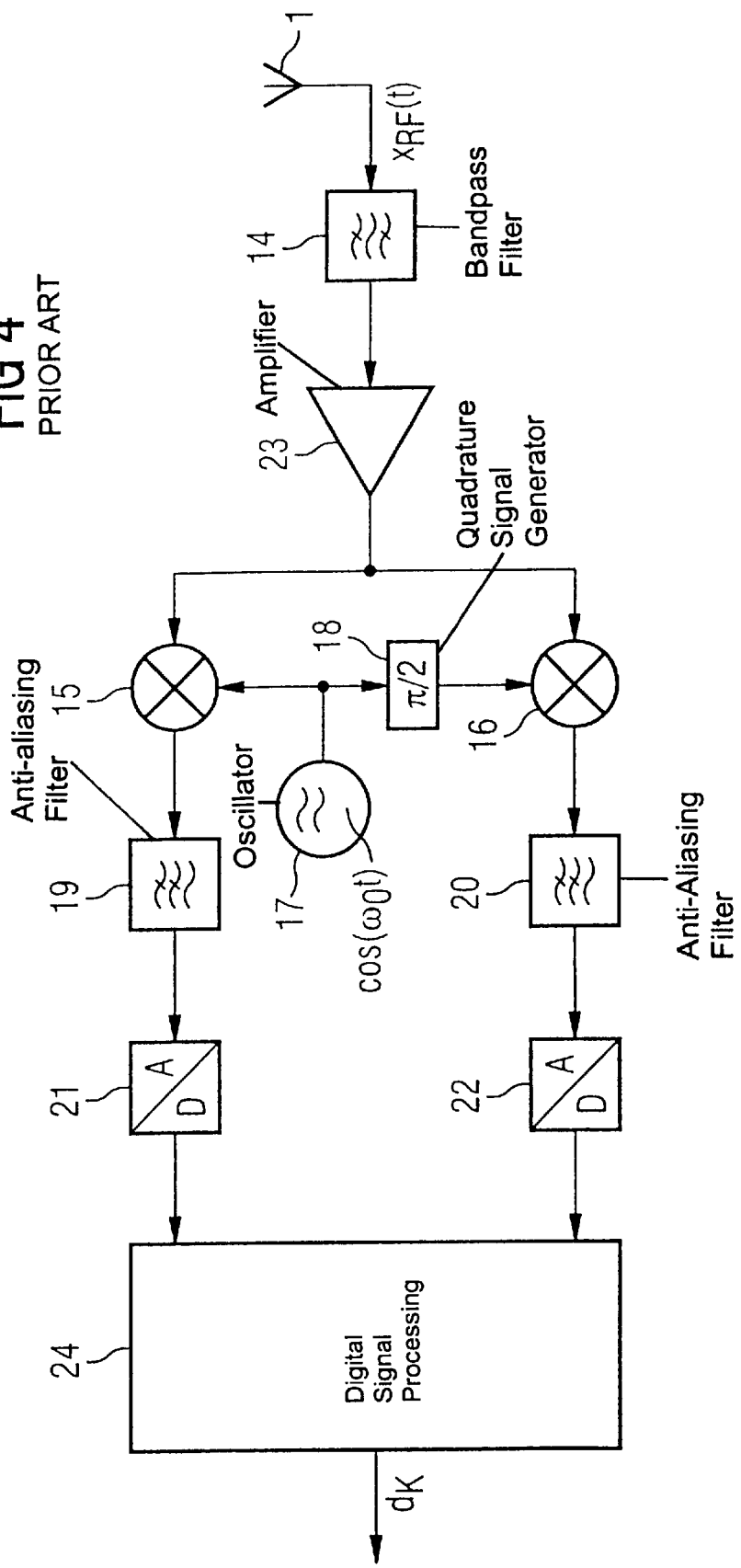
FIG. 4 shows a simplified block diagram of a prior art homodyne receiver.

The present invention will be explained in the following text using, by way of example, MSK-modulated (Minimum Shift Keying) signals for a noise-free situation. However, the invention is not restricted to this type of modulation, but can be used in general for all types of angle modulation, in particular for all CPFSK modulation methods (Continuous Phase Frequency Shift Keying) such as that used, for example, in accordance with the DECT or GSM (Global System for Mobile Communications) mobile radio standard.

With MSK modulation, the phase of the carrier signal is shifted through $-\pi/2$ or through $+\pi/2$ depending on the binary value $d_k \in \{-1,1\}$ to be transmitted.

Referring now to the figures of the drawing in detail and first, particularly, to FIG. 1 thereof, there is shown a communications system including a transmitter 25 and a receiver 27. The radio-frequency MSK signal $X_{RF}(t)$ that is transmitted via a transmission antenna 26 by the transmitter 25 and that is received via a receiving antenna 1 by the receiver 27 in general has the form:

$$X_{RF}(t)=\cos(\omega_0 t+\phi_0+\Delta\phi+\theta(t)).$$

In this case, $\omega_0$ denotes the carrier frequency, $\phi_0$ is the zero phase, $\Delta\phi$ the phase shift between the RF received signal and the signal from the local oscillator (not shown in FIG. 1) in the receiver 27, and $\theta(t)$ denotes the phase shift to the carrier signal resulting from the binary information to be transmitted. The transmitter 25 shown in FIG. 1 is designed such that not only are the actual message bits $d_k$ transmitted by phase modulation, but also coding bits, which the transmitter 25 inserts into the message bit sequence at regular intervals before carrying out the phase modulation. In particular, the invention proposes that coding be carried out such that a coding bit with the fixed binary value "1" is inserted between each two successive message bits, so that the carrier phase is varied by $+\pi/2$ during the phase modulation by using this coding bit.

The RF signal $X_{RF}(t)$ which is thus generated by the transmitter 25 and is received by the receiver 27 is first of all amplified by a linear amplifier 2 and is supplied to a mixer 3. The mixer 3 multiplies the received RF signal $X_{RF}(t)$ by the signal $2\cos(\omega_0 t+\phi_0)$ that is generated by the already mentioned local oscillator in the receiver 27, so that the mixer 3 produces the baseband signal $y(t)=\cos(\Delta\phi+\theta(t))$. The baseband signal $y(t)$ is low-pass filtered using an anti-aliasing filter 4, is sampled at the clock rate $1/T$ using an A/D converter 5, and is converted to a digital data sequence $y_k=\cos(\Delta\phi+\theta_k)$.

The time profile of the carrier phase change produced by the binary information transmitted in the signal $X_{RF}(t)$ is defined by the following formula:

$$\theta_k=\pi/2 \cdot (I_k+I_{k-1}+ \ldots +I_1+I_0)$$

Based on the coding described above and as carried out at the transmitter end, in which each alternate bit to be transmitted has been set to the binary value "1", the coefficients are given by:

$$I_k=l, \text{ if } k=2n,$$

and $$I_k=d_k \text{ if } k=2n+1$$

(n=0, 1, 2, . . . )

This coding is a special case of Hadamard coding, and is equivalent to corresponding pulse shaping. The coding results in the bit rate $2/T$.

The digital demodulator 6 shown in FIG. 1 determines the transmitted message bits $d_k$ by evaluating the individual sample values $y_k$. FIG. 2 shows a simplified block diagram of one possible implementation of the digital demodulator 6.

As can be seen from the illustration in FIG. 2, this exemplary embodiment of the digital demodulator 6 has only three storage or delay elements 7–9 that form a shift register of length 3, two multipliers 10 and 11, an adder 12, and a sign detector 13. The multipliers 10 and 11 are connected to the individual storage elements 7–9 of the shift register such that one of these two multipliers always multiplies two sample values in the baseband signal sequence $y_k$ by one another—wherein these multiplied sample values originate from two successive message bits, while the other multiplier multiplies together two sample values in the baseband signal sequence $y_k$—that originate from two successive coding bits. The adder 12 adds the multiplier so that the sign detector 13 can easily determine, and can output, the values of the transmitted message bits $d_k$ by evaluating the mathematical sign of the result of the addition.

The already mentioned coding not only provides pulse shaping but also allows, in particular, phase-incoherent demodulation and detection of the message bits $d_k$ irrespective of any possible phase shift $\Delta\phi$ between the received radio-frequency signal $X_{RF}(t)$ and the local oscillator signal, so that no carrier phase control is required.

FIG. 3 shows the bit error rate (BER) that can be achieved when using the present invention, as a function of the bit signal-to-noise ratio $E_b/N_0$. The corresponding BER characteristics for other known demodulation methods (coherent and incoherent) are shown for comparison. The implementation complexity can be reduced by using the present invention, and as shown in FIG. 3, in comparison to DECT receivers which use incoherent FSK (Frequency-Shift-Keying) demodulation requiring a complex I/Q signal path, the invention enables a bit error rate of $10^{-3}$ to be achieved in which the power efficiency is only reduced by about 2 dB.

However, the power efficiency can also be improved by using higher-value Hadamard coding, rather than the Hadamard coding described above, in which the coding bits are inserted at longer intervals into the message bit sequence that will be transmitted. In this case, of course, the digital demodulator 6 shown in FIG. 2 must be matched to the shift register in an appropriate manner with regard to the length of the shift register and the linking of the two multipliers 10, 11.

I claim:

1. A communications system, comprising:
   a transmitter for transmitting an angle-modulated signal having communication information and coding information that have been modulated onto a carrier signal at a carrier frequency, said transmitter inserting the coding information into the communication information at regular intervals, said transmitter constructing the angle modulated signal by performing an angle modulation process in which, for each item of the communication information and for each item of coding information, a corresponding phase change in the carrier signal is obtained;
   a receiver for receiving the angle-modulated signal;
   said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of coding information;
   said receiver having an analog/digital converter for sampling the phase profile of the baseband signal from the mixer and for converting the baseband signal to a digital data sequence having phase sample values;
   said receiver having a digital evaluation device receiving the digital data sequence from said analog/digital converter;
   said digital evaluation device initially separately, obtaining first processing results by processing ones of the phase sample values corresponding to successive items of the communication information and obtaining second processing results by processing ones of the phase sample values corresponding to successive items of the coding information;
   said digital evaluation device combining the first processing results with the second processing results to obtain a combination result;
   said digital evaluation device evaluating the combination result to recover the communication information as a function of the combination result;
   said digital evaluation device including:
      a shift register configuration for buffer-storing successive ones of the phase sample values of the digital data sequence from said analog/digital converter, said shift register configuration sequentially receiving the successive ones of the phase sample values of the digital data sequence from said analog/digital converter;
      said shift register configuration having a first delay element, a second delay element, and a third delay element connected in series;
      a first multiplier for obtaining a first result by multiplying together the ones of the phase sample values corresponding to the successive items of the communication information;
      a second multiplier for obtaining a second result by multiplying together the ones of the phase sample values that correspond to the successive items of the coding information;
      a combiner being an adder for obtaining the combination result by combining the first result and the second result; and
      a detector device for evaluating the combination result from said combiner to recover the communication information as a function of the combination result;
   at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values being stored in said third delay element;
   at the given instant of time, said first multiplier multiplying the fourth given one of the phase sample values by the second given one of the phase sample values; and
   at the given instant of time, said second multiplier multiplying the third given one of the phase sample values by the first given one of the phase sample values.

2. A communications system, comprising:
   a transmitter for transmitting an angle-modulated signal having communication information and coding information that have been modulated onto a carrier signal at a carrier frequency, said transmitter inserting the coding information into the communication information at regular intervals, said transmitter constructing the angle modulated signal by performing an angle modulation process in which, for each item of the communication information and for each item of coding information, a corresponding phase change in the carrier signal is obtained;
   a receiver for receiving the angle-modulated signal;
   said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of coding information;

said receiver having an analog/digital converter for sampling the phase profile of the baseband signal from the mixer and for converting the baseband signal to a digital data sequence having phase sample values;

said receiver having a digital evaluation device receiving the digital data sequence from said analog/digital converter;

said digital evaluation device initially separately, obtaining first processing results by processing ones of the phase sample values corresponding to successive items of the communication information and obtaining second processing results by processing ones of the phase sample values corresponding to successive items of the coding information;

said digital evaluation device combining the first processing results with the second processing results to obtain a combination result;

said digital evaluation device evaluating the combination result to recover the communication information as a function of the combination result;

said digital evaluation device including:
 a shift register configuration for buffer-storing successive ones of the phase sample values of the digital data sequence from said analog/digital converter, said shift register configuration sequentially receiving the successive ones of the phase sample values of the digital data sequence from said analog/digital converter;
 said shift register configuration having a first delay element, a second delay element, and a third delay element connected in series;
 a first multiplier for obtaining a first result by multiplying together the ones of the phase sample values corresponding to the successive items of the communication information;
 a second multiplier for obtaining a second result by multiplying together the ones of the phase sample values corresponding to the successive items of the coding information;
 a combiner for obtaining the combination result by combining the first result and the second result; and
 a detector device for evaluating the combination result from said combiner to recover the communication information as a function of the combination result;

at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values being stored in said third delay element;

at the given instant of time, said first multiplier multiplying the fourth given one of the phase sample values by the second given one of the phase sample values; and at the given instant of time, said second multiplier multiplying the third given one of the phase sample values by the first given one of the phase sample values.

3. A communications system, comprising:
a transmitter for transmitting an angle-modulated signal having communication information and coding information that have been modulated onto a carrier signal at a carrier frequency, said transmitter inserting the coding information between each two successive items of the communication information at regular intervals, said transmitter constructing the angle modulated signal by performing an angle modulation process in which, for each item of the communication information and for each item of coding information, a corresponding phase change in the carrier signal is obtained;

a receiver for receiving the angle-modulated signal;

said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of coding information;

said receiver having an analog/digital converter for sampling the phase profile of the baseband signal from the mixer and for converting the baseband signal to a digital data sequence having phase sample values;

said receiver having a digital evaluation device receiving the digital data sequence from said analog/digital converter;

said digital evaluation device initially separately, obtaining first processing result by processing two of the phase sample values corresponding to the successive items of the communication information and obtaining second processing result by processing two of the phase sample values corresponding to the successive items of the coding information;

said digital evaluation device combining the first processing results with the second processing results to obtain a combination result;

said digital evaluation device evaluating the combination result to recover the communication information as a function of the combination result;

a first multiplier for obtaining the first result;

a second multiplier for obtaining the second result;

a shift register configuration sequentially receiving the successive ones of the phase sample values of the digital data sequence from said analog/digital converter;

said shift register configuration having a first delay element, a second delay element, and a third delay element connected in series;

at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values being stored in said third delay element;

at the given instant of time, said first multiplier multiplying the fourth given one of the phase sample values by the second given one of the phase sample values; and at the given instant of time, said second multiplier multiplying the third given one of the phase sample values by the first given one of the phase sample values.

4. A receiver unit for receiving angle-modulated signals, comprising:
a receiver for receiving an angle-modulated signal having communication information and coding information, in which the coding information has been inserted at regular intervals into the communication information, and in which the communication information and the coding information have been modulated onto a carrier signal at a carrier frequency using an angle modulation process such that, for each item of the communication information and for each item of the coding information, a corresponding phase change in the carrier signal is obtained;

said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of the coding information;

said receiver having an analog/digital converter for sampling the phase profile of the baseband signal from the mixer and for converting the baseband signal to a digital data sequence having phase sample values;

said receiver having a digital evaluation device receiving the digital data sequence from said analog/digital converter;

said digital evaluation device initially separately, obtaining first processing results by processing ones of the phase sample values corresponding to successive items of the communication information and obtaining second processing results by processing ones of the phase sample values corresponding to successive items of the coding information;

said digital evaluation device including:
- a shift register configuration for buffer-storing successive ones of the phase sample values of the digital data sequence from said analog/digital converter; said shift register configuration sequentially receiving the successive ones of the phase sample values of the digital data sequence from said analog/digital converter;
- said shift register configuration having a first delay element, a second delay element, and a third delay element connected in series;
- a first multiplier for obtaining a first result by multiplying together the ones of the phase sample values corresponding to the successive items of the communication information;
- a second multiplier for obtaining a second result by multiplying together the ones of the phase sample values corresponding to the successive items of the coding information;
- a combiner being an adder for combining the first processing result with the second processing result to obtain a combination result; and
- a detector device for evaluating the combination result from said combiner to recover the communication information as a function of the combination result;

at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values being stored in said third delay element;

at the given instant of time, said first multiplier multiplying the fourth given one of the phase sample values by the second given one of the phase sample values; and at the given instant of time, said second multiplier multiplying the third given one of the phase sample values by the first given one of the phase sample values.

5. A receiver unit for receiving angle-modulated signals, comprising:

a receiver for receiving an angle-modulated signal having communication information and coding information, in which the coding information has been inserted at regular intervals into the communication information, and in which the communication information and the coding information have been modulated onto a carrier signal at a carrier frequency using an angle modulation process such that, for each item of the communication information and for each item of the coding information, a corresponding phase change in the carrier signal is obtained;

said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of the coding information;

said receiver having an analog/digital converter for sampling the phase profile of the baseband signal from the mixer and for converting the baseband signal to a digital data sequence having phase sample values;

said receiver having a digital evaluation device receiving the digital data sequence from said analog/digital converter;

said digital evaluation device initially separately, obtaining first processing results by processing ones of the phase sample values corresponding to successive items of the communication information and obtaining second processing results by processing ones of the phase sample values corresponding to successive items of the coding information;

said digital evaluation device including:
- a shift register configuration for buffer-storing successive ones of the phase sample values of the digital data sequence from said analog/digital converter, said shift register configuration sequentially receiving the successive ones of the phase sample values of the digital data sequence from said analog/digital converter;
- said shift register configuration having a first delay element, a second delay element, and a third delay element connected in series;
- a first multiplier for obtaining a first result by multiplying together the ones of the phase sample values corresponding to the successive items of the communication information;
- a second multiplier for obtaining a second result by multiplying together the ones of the phase sample values corresponding to the successive items of the coding information;
- a combiner for obtaining a combination result by combining the first result and the second result; and
- a detector device for evaluating the combination result from said combiner to recover the communication information as a function of the combination result;

at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values being stored in said third delay element;

at the given instant of time, said first multiplier multiplying the fourth given one of the phase sample values by the second given one of the phase sample values; and at the given instant of time, said second multiplier multiplying the third given one of the phase sample values by the first given one of the phase sample values.

6. A receiver unit for receiving angle-modulated signals, comprising:

a receiver for receiving an angle-modulated signal having communication information and coding information, in which the coding information has been inserted at regular intervals into the communication information, and in which the communication information and the coding information have been modulated onto a carrier signal at a carrier frequency using an angle modulation process such that, for each item of the communication information and for each item of the coding information, a corresponding phase change in the carrier signal is obtained;

a transmitter for inserting the coding information between each two successive items of the communication information;

said receiver having a mixer for mixing the angle-modulated signal with a signal having the carrier frequency of the carrier signal such that a baseband signal is obtained in which the carrier frequency has been removed, the baseband signal having a phase profile corresponding to the phase change for each item of the communication information and to the phase change for each item of the coding information;

said receiver having an analog/digital converter for sampling the phase profile of the baseband signal from the mixer and for converting the baseband signal to a digital data sequence having phase sample values;

said receiver having a digital evaluation device receiving the digital data sequence from said analog/digital converter;

said digital evaluation device of said receiver, initially separately, obtaining first processing result by processing two of the phase sample values corresponding to the successive items of the communication information and obtaining second processing result by processing two of the phase sample values corresponding to the successive items of the coding information;

said digital evaluation device combining the first processing result with the second processing result to obtain a combination result;

said digital evaluation device evaluating the combination result to recover the communication information as a function of the combination result;

a first multiplier for obtaining the first result;

a second multiplier for obtaining the second result;

a shift register configuration sequentially receiving the successive ones of the phase sample values of the digital data sequence from said analog/digital converter;

said shift register configuration having a first delay element, a second delay element, and a third delay element connected in series;

at a given instant of time, a fourth given one of the phase sample values being supplied to said first delay element from said analog/digital converter, a third given one of the phase sample values being stored in said first delay element, a second given one of the phase sample values being stored in said second delay element, and a first given one of the phase sample values is stored in said third delay element;

at the given instant of time, said first multiplier multiplying the fourth given one of the phase sample values by the second given one of the phase sample values; and at the given instant of times said second multiplier multiplies the third given one of the phase sample values by the first given one of the phase sample values.

7. The communications system according to claim 2, wherein:

the communication information is a sequence and each item in the sequence has a binary value;

said transmitter modulates the communication information and modulates the coding information onto the carrier signal such that, in the angle-modulated signal, a phase change of $+\pi/2$ in the carrier signal is allocated to a first binary value that will be transmitted and a phase change of $-\pi/2$ in the carrier signal is allocated to a second binary value that will be transmitted; and said detector device detects a mathematical sign of the combination result from said combiner to recover the binary value of each item of the sequence of the communication information as a function of the mathematical sign.

8. The communications system according to claim 7, wherein a first binary value that results in a phase change of $+\pi/2$ in the carrier signal during the angle modulation in said transmitter is chosen as a value for the coding information.

9. The receiver unit according to claim 5, wherein:

the communication information is a sequence and each item in the sequence has a binary value;

said transmitter modulates the communication information and modulates the coding information onto the carrier signal such that, in the angle-modulated signal, a phase change of $+\pi/2$ in the carrier signal is allocated to a first binary value that will be transmitted and a phase change of $-\pi/2$ in the carrier signal is allocated to a second binary value that will be transmitted; and said detector device detects a mathematical sign of the combination result from said combiner to recover the binary value of each item of the sequence of the communication information as a function of the mathematical sign.

10. The receiver unit according to claim 9, wherein a first binary value that results in a phase change of $+\pi/2$ in the carrier signal during the angle modulation in said transmitter is chosen as a value for the coding information.

* * * * *